United States Patent [19]

Welke et al.

[11] 4,094,534
[45] June 13, 1978

[54] DETACHABLE BALLAST VEHICLE STABILIZER

[75] Inventors: Helmut Welke; Karl Tullius, both of Cologne, Germany

[73] Assignee: Klöckner-Humboldt-Deutz Aktiengesellschaft, Cologne, Germany

[21] Appl. No.: 747,437

[22] Filed: Dec. 6, 1976

[30] Foreign Application Priority Data

Dec. 4, 1975 Germany .......................... 2554581

[51] Int. Cl.² .................. B60B 39/00; B60R 19/04; B60R 27/00; B61C 15/04
[52] U.S. Cl. ................................ 280/760; 280/759; 293/69 R
[58] Field of Search ............... 105/1 A; 280/759, 760; 293/69 R

[56] References Cited

U.S. PATENT DOCUMENTS

| 2,701,728 | 2/1955 | Miller ................................. 293/69 R |
| 2,797,121 | 6/1957 | Aud .................................... 293/69 R |
| 3,490,787 | 1/1970 | Latterman et al. ................. 293/69 R |
| 3,822,073 | 7/1974 | Sieren ................................. 280/760 |
| 3,944,252 | 3/1976 | Barth .................................. 280/759 |

FOREIGN PATENT DOCUMENTS 2,512,721  9/1976  Germany .......................... 296/760

*Primary Examiner*—Drayton E. Hoffman
*Assistant Examiner*—Howard Beltran
*Attorney, Agent, or Firm*—Walter Becker

[57] ABSTRACT

An arrangement of a detachable ballast weight, especially at the front side of an agricultural motor vehicle, which includes a holding device connected to the vehicle transverse to the driving direction of the latter for receiving the ballast weight. The ballast weight is adapted non-rotatably to be suspended on the holding device by catching behind the holding device or a protrusion thereof and is adapted to be locked in its suspended position by means of a locking shaft when the latter extends transverse to the ballast weight and behind a portion thereof. The two ends of the locking shaft are by means of radially engaging clamping elements detachably connectable to the holding device or to a part connected thereto.

8 Claims, 10 Drawing Figures

DETACHABLE BALLAST VEHICLE STABILIZER

The present invention relates to the arrangement of the removable ballast weight, especially on the front side of an agricultural motor vehicle, with holding means connected transverse to the driving direction for receiving the ballast weight. More specifically, the present invention relates to an arrangement as just set forth, in which the ballast weight is adapted nonrotatably to be suspended on said holding means for catching therebehind or by engaging a projection on said holding means, said ballast weight being adapted to be locked in spaced relationship to said holding means or projection by means of a blocking shaft extending transverse to said ballast weight and engaging from behind a portion thereof.

A ballast weight of the above mentioned type has been described in the German Offenlegungsschrift No. 25 12 721 according to which the ballast weight by means of a holding arm engages holding means designed as a pull rail extending over the width of the vehicle. The ballast weight is disc-shaped so that a plurality of weights can be arranged adjacent to each other on said holding means. Below the holding arms of the ballast weights, there is in the pull rail provided a flat groove for guiding the blocking shaft which is cam shaped. The built-in ballast weights extend by means of a recess at that side thereof which faces away from the blocking shaft over a corresponding projection within the pull rail. By turning the blocking shaft, the holding arms of the ballast weights are clamped in the pull rail. This arrangement has the advantage that the individual ballast weights cannot drop out even in a greatly inclined position of the vehicle after the blocking shaft has been unlocked. This is due to the fact that the ballast weights due to their center of gravity position and in view of the engagement from behind of said projections, are held in said pull rail. However, it has been found that this type of connection of the ballast weights is not sufficient during the operation to avoid vertical movements within the prevailing play, and thus corresponding noises.

It is, therefore, an object of the present invention so to improve holding means for a ballast weight of the above mentioned type that by simple means a firm clamping of the ballast weight will be assured while avoiding the above mentioned drawbacks.

These and other objects and advantages of the invention will appear more clearly from the following specification in connection with the accompanying drawings, in which.

Figure 3:
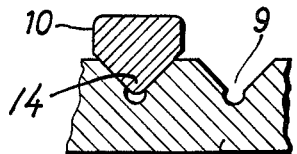
Figure 4:
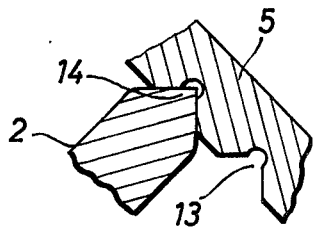
Figure 5:
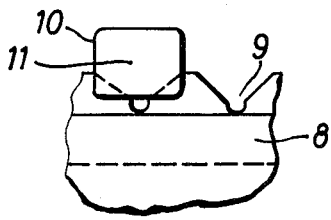
Figure 1:
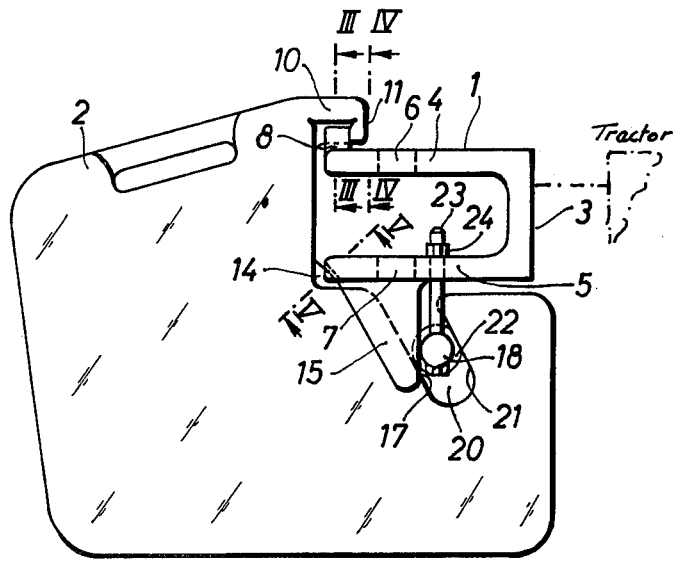
FIG. 1 is a side view of a ballast weight with a blocking shaft and a clamping element according to the invention.
Figure 2:
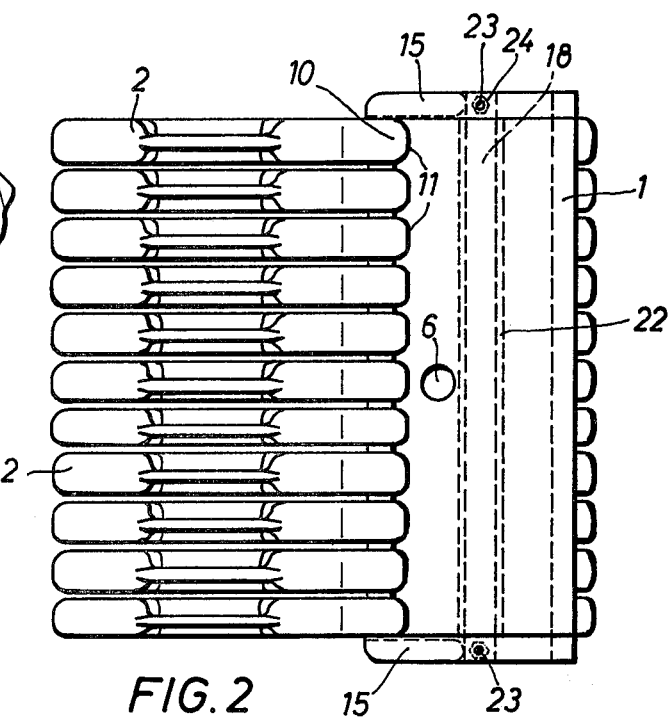
FIG. 2 is a top view of the ballast weight of FIG. 1.

FIGS. 3–5 respectively illustrate details of FIGS. 1 and 2.

Figure 6:
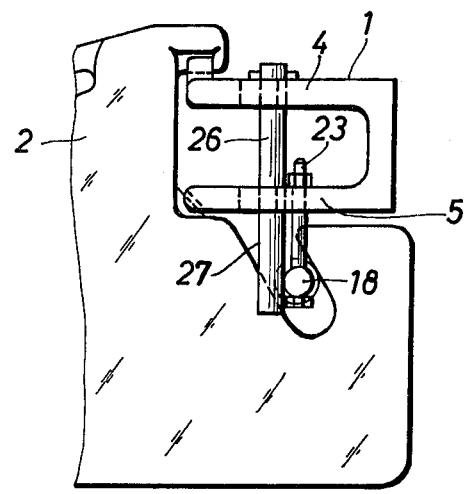

FIG. 6 is a side view of a ballast weight with a connection similar to that shown in FIG. 1.

Figure 7:
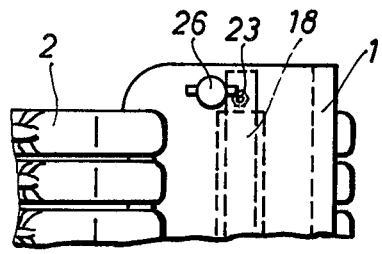

FIG. 7 is a partial top view of the ballast weight according to FIG. 6.

Figure 8:
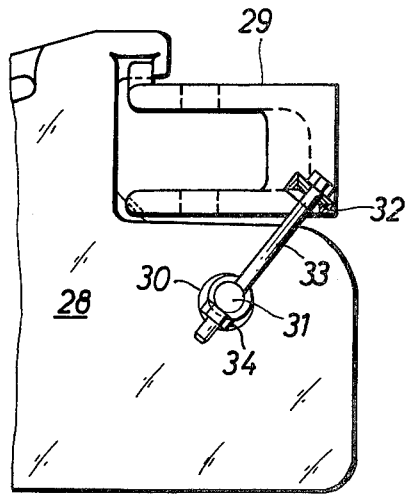
Figure 9:
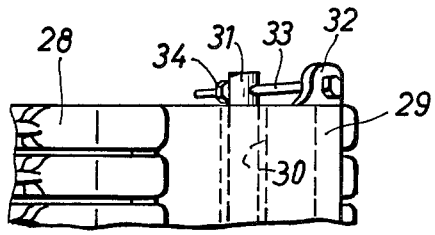
Figure 10:
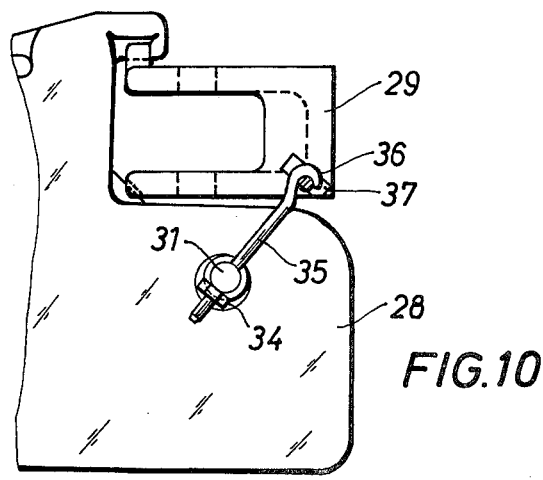

FIGS. 8 to 10 illustrate additional embodiments of the invention.

The arrangement according to the present invention is characterized primarily in that the two ends of the blocking shaft are detachably connected to the holding means or a part connected thereto by means of clamping elements which radially engage the two ends of the blocking shaft. By means of such an arrangement, the ballast weight can be clamped to its holding means to a desired extent so that during the operation, undesired self-motivated movements and the inherent noises will be avoided.

According to a further development of the invention, the ballast weight is in a manner known per se divided over its width in a disc-shaped manner while each individual ballast is by itself insertable. For arresting the individual ballast weights in transverse direction, it is expedient to provide a guiding groove or the like on the holding means at least at one engaging side for each individual ballast weight.

With a ballast weight with at least two supporting bearings spaced from each other and located on the holding means it is provided according to the invention that the clamping elements so engage the ballast weights via the clamping shaft that a moment will be exerted on all supporting bearings. In order firmly to clamp the ballast weights in conformity with the operational conditions, it is advantageous to design the individual clamping elements in the manner of a screw.

For clamping the ballast weights, the clamping shaft may for instance be arranged in a bore which extends through all ballast weights and is parallel to the holding means.

According to another advantageous arrangement according to the invention, the ballast weights are for receiving the blocking shaft provided with a slot-shaped recess which originates at the holding means and is arranged with an incline toward the rear. On both sides of the ballast weights on the holding means in front of the blocking shaft there are provided supporting bearings the supporting surfaces of which which engage the blocking shaft extend substantially vertically and together with the supporting surfaces for the blocking shaft of the slot-shaped recess in the ballast weight form a wedge shape which tapers to the opening of said recess, while the clamping screws are arranged in the longitudinal direction of said wedge shape.

In order during the clamping operation to exert a uniform clamping pressure upon all ballast weights, it may be expedient to design the holding means for the ballast weights arc shaped in conformity with the bend to be expected of the clamped blocking shaft. Expediently, that region of the blocking shaft which is located within the ballast weight is provided with a cover of elastic material.

Referring now to the drawings in detail and FIGS. 1 to 5 in particular, a tractor is provided with holding means 1 for disc-shaped ballast weights 2 while the rear section 3 of said holding means is for instance connected to a non-illustrated front axle support. The holding means 1 which has a U-shaped profile preferably extends over the width of the front cover of the tractor and is suitable as front pulling and pressing mouth. For this purpose, the central portion of the holding means 1 is provided with receiving bores 4 and 5 for a non-illustrated coupling bolt so that when the ballast weights 2 are removed, a corresponding pulling or pressing member of an implement can be connected up. It is, of course, understood that the holding means 1 may also be provided with eccentrically located receiving bores whereby an eccentric connection of an implement pole will be possible.

On the upper leg 4 of the U-shaped holding means 1, above the front edge there is provided a strip or bar 8 which extends over the length of the holding means 1 and is firmly connected to the latter. This strip or bar has arranged therein V-shaped notches 9 as shown in FIGS. 3 and 4, the greatest width of which approximately corresponds to the thickness of a ballast weight 2. The disc-shaped ballast weights 2 respectively have at their upper end projections 10 for suspension on a bar 8. Each of said projections 10, within the region of the notches 9, has a V-shape corresponding to said notches 9 for engaging the respective notch 9. That portion of the projection 10 which extends over the bar 8 toward the rear engages from the rear the bar 8 and thus assures a safe hold of the ballast weight 2 on the holding means 1.

The lower leg 5 of the holding means 1 is at the front side thereof in conformity with FIG. 5 likewise provided with V-shaped notches 13. Similarly, the ballast weights 2 are for engaging the notches 13 provided with corresponding V-shaped ribs 14. The notches or grooves 9 and 13 serve in particular for a lateral resting of the individual ballast weights 2.

On both sides of the ballast weights 2 on the U-shaped holding means 1 and below the leg 5 there is provided a nose-shaped protrusion 15 which as supporting bearings at their rear supporting surfaces 17 engage a blocking shaft 18. For purposes of receiving the blocking shaft 18, slot-shaped recess 20 which is open below the holding means 1 is provided in the ballast weights 2. The opening 20 is arranged with an inclination toward the rear. Locking or blocking shaft 18 engages in the recesses 20 the rear supporting surfaces 21 of said recesses 20. The arrangement of the supporting bearings 15 in the recesses 20 with regard to each other is such that their supporting surfaces 17 and 21 for the blocking shaft 18 have a wedge shape which tapers toward the opening of the recesses 20. The blocking shaft 18 is within that region which is located within the ballast weights 2 and recesses 20, provided with a cover 22 of an elastic material in order to compensate for tolerances within the recesses 20 and for slight deformations of the blocking shaft 18. Both ends of the blocking shaft 18 which project at both sides from the recess 20, are respectively engaged by a screw 23 which serves as clamping element. Each screw 23 has its threaded section extend through corresponding bores in the lower leg 5 of the holding means and is provided with a screw nut 24.

The individual ballast weights 2 are so designed that their center of gravity is located ahead of the holding means 1. In this way, the ballast weights 2 when being suspended in the corresponding notch 9 are in view of the location of the center of gravity pressed with their rib 14 into the corresponding notch 13 thereby assuring the lateral fixing of the individual ballast weights 2. After insertion of the blocking shaft 18 and of the screws 23, the nuts 24 thereof are tightened. In this way, the blocking shaft resting on one hand against the supporting surface 17 and on the other hand against the supporting surface 21 exerts a moment upon the ballast weights which will assure a play-free firm seating of the ballast weights in the notches 9 and 13.

With the embodiment according to FIGS. 6 and 7, the ballast weights 2 have the same shape as those of FIG. 2. Merely below the holding means 1 for the ballast weight 2 the nose-shaped supporting bearings 15 of FIG. 2 are respectively replaced by a pivot 26. The pivots 26 are so connected in both legs 4 and 5 that the ends 27 which protrude from the holding means 1 in downward direction and serve for engaging the blocking shaft 8 extend vertically with regard to the holding means 1.

The ballast weights 28 shown in FIGS. 8 and 9 are suspended on a U-shaped holding means 29 in the above described manner and are laterally fixed. Below the holding means 29 there is provided a circular opening 30 for receiving a blocking shaft 31, said opening 30 extending through all of the said ballast weights 28.

Both ends of the holding means 29 are provided with a bore having projections 32 which serve for respectively receiving clamping screws 33. These clamping screws 33 have their threaded section extend through that end of the blocking shaft 31 which laterally projects from the ballast weights 28, and have their rear threaded section which projects from the blocking shaft 31 provided with a threaded nut 34 for clamping purposes. The holding means 29 is arc shaped in horizontal direction in conformity with the bend to be expected of the clamped blocking shaft 31. This has the advantage that when the blocking shaft 31 is clamped in, all ballast weights 28 will be under substantially uniform clamping force.

According to FIG. 10, the screw 35 arranged for clamping the blocking shaft 31 is at that end thereof which faces the holding means 29 provided with an arc-shaped hook 36 instead of a head. Of course, that portion 37 which is connected to the holding means 29 is so designed that the hook 36 is easily suspended on said hook. Moreover, the opening in the blocking shaft 31 through which the screw 35 extends is so designed as an oblong hole that the hook 36 can be passed therethrough. In view of this feature, it is during the installation and removal of individual ballast weights merely necessary to loosen the nut 34 because the screw 35 can subsequently in a simple manner be removed by unhooking the hook 36 from part 37 and pulling it out of the blocking shaft 31.

It is, of course, to be understood that the present invention is, by no means, limited to the specific showing in the drawings, but also comprises any modifications within the scope of the appended claims.

What we claim is:

1. In combination, a ballast weight means and agricultural motor vehicle: a holding device having said ballast weight means detachably suspended thereon and releasably connected to said motor vehicle, locking shaft means extending transverse to and through said ballast weight means and being adjustable selectively in the direction toward and away from said holding device, and means operatively connected to said locking shaft means as well as operable in response to said locking shaft means being adjusted toward said holding device thereby to fix and lock said ballast weight means and said holding device to releasable secure the same to each other to avoid undesired vibration and noise during operative use of said ballast weight means with the vehicle, said means operatively connected to said locking shaft means including clamping elements respectively connecting the ends of said locking shaft means to said holding device, said holding device for each ballast weight means comprising at least two supporting bearings spaced from each other for respective engagement with said ballast weight means, and said clamping elements through the intervention of said locking shaft acting upon said clamping elements to exert a moment upon all of said supporting bearings.

2. The combination according to claim 1, in which said ballast weight means comprises a plurality of discs respectively insertable into and connectable to said holding device.

3. The combination according to claim 1, in which at least one side of said holding device is provided with guiding groove means for respectively engaging and laterally supporting said ballast weight means.

4. The combination according to claim 1, in which each of said clamping elements includes screw means.

5. The combination according to claim 1, in which all of said ballast weight means are provided with axially aligned bores, and in which said locking shaft means extends through all of said bores.

6. The combination according to claim 1, in which said ballast weight means are respectively provided with aligned slot-shaped recess means open toward said holding device and starting adjacent thereto while being inclined toward that side of said ballast weight means which forms the rear side thereof namely the side which is intended to face the vehicle to which said ballast weight means is to be connected, and in which said holding device at both sides of said ballast weight means is in front of said locking shaft means provided with supporting means having surface means engaging said locking shaft means, that inclined side of said slot-shaped recess means which is closest to said rear side of said ballast weight means likewise engaging said locking shaft means and with said surface means forming a wedge-shaped path which tapers toward said holding device and along which path said locking shaft means is adjustable.

7. The combination according to claim 1, in which said holding device for said ballast weight means is curved in conformity with the bend to be expected of said locking shaft means in its locking position.

8. The combination according to claim 1, in which said locking shaft means has that portion thereof which is located within the region of said ballast weight means provided with a cover of elastic material.

* * * * *